United States Patent
Christiano et al.

(10) Patent No.: US 9,266,274 B2
(45) Date of Patent: Feb. 23, 2016

(54) HEATER-COOLER SYSTEM FOR A BARREL OF AN EXTRUDER AND A METHOD OF USING THE SAME

(75) Inventors: John P. Christiano, Old Lyme, CT (US); Norton Wheeler, Mystic, CT (US); Jason Baird, Colchester, CT (US); John Radovich, Mystic, CT (US); Thomas J. Oravits, Durham, CT (US)

(73) Assignee: Davis Standard, LLC, Pawcatuck, CT (US)

( * ) Notice: Subject to any disclaimer, the term of this patent is extended or adjusted under 35 U.S.C. 154(b) by 960 days.

(21) Appl. No.: 13/275,453

(22) Filed: Oct. 18, 2011

(65) Prior Publication Data
US 2012/0090819 A1    Apr. 19, 2012

Related U.S. Application Data

(60) Provisional application No. 61/394,032, filed on Oct. 18, 2010.

(51) Int. Cl.
| B29C 47/92 | (2006.01) |
| B29C 47/08 | (2006.01) |
| B29C 47/82 | (2006.01) |
| B29C 47/00 | (2006.01) |

(52) U.S. Cl.
CPC ............. *B29C 47/92* (2013.01); *B29C 47/0811* (2013.01); *B29C 47/822* (2013.01); *B29C 47/825* (2013.01); *B29C 47/0009* (2013.01); *B29C 2947/92704* (2013.01); *B29C 2947/92895* (2013.01)

(58) Field of Classification Search
CPC ...... B29C 47/822; B29C 47/825; B29C 47/92
USPC .......................................... 366/149; 425/459
See application file for complete search history.

(56) References Cited

U.S. PATENT DOCUMENTS

| 2,653,348 | A | * | 9/1953 | Elgin et al. ..................... 425/208 |
| 5,895,683 | A | * | 4/1999 | Crook et al. ................... 426/516 |
| 5,913,677 | A | * | 6/1999 | Von Beckmann ............... 432/13 |
| 6,011,335 | A | * | 1/2000 | Belley ............................. 310/89 |
| 6,099,285 | A | * | 8/2000 | Kurihara et al. ............... 425/144 |
| 6,486,445 | B1 | * | 11/2002 | Pendergraft ................... 219/424 |
| 6,828,371 | B2 | * | 12/2004 | Lee et al. ....................... 524/445 |

FOREIGN PATENT DOCUMENTS

| DE | 102009034565 A1 | * | 2/2010 | ............. B29C 47/82 |
| DE | 102010049371 A1 | * | 4/2012 | |
| DE | 102010049374 A1 | * | 4/2012 | |
| DE | 202014103763 U1 | * | 10/2014 | |

* cited by examiner

OTHER PUBLICATIONS

International Search Report and Written Opinion for PCT/US2011/056691 dated Mar. 1, 2012.

*Primary Examiner* — Charles Cooley
*Assistant Examiner* — Marc C Howell
(74) *Attorney, Agent, or Firm* — MKG, LLC (57) ABSTRACT

A heater-cooler system includes a plurality of heaters in thermal communication with a barrel of an extruder. The heater-cooler system includes a plurality of shroud assemblies that each define a cavity between a shroud assemblies and one of the heaters. Each heater is enclosed by one of the shroud assemblies. Each of the shroud assemblies has an intake port and an exhaust port. The heater-cooler system includes a blower connected to the intake port. The blower delivers air to the cavity. A portion of the each of the shroud assemblies at the exhaust port defines a flap moveably integrated therewith. The flap is opened by an increase in pressure in the cavity caused by operation of the blower. The flap seals the cavity in a closed position upon termination of blower operation.

7 Claims, 9 Drawing Sheets

FIG. 11 a heater-cooler system for a barrel of an extruder and a method of using the same

CROSS-REFERENCE TO RELATED APPLICATIONS

The present application claims the benefit under 35 U.S.C. §119 (e) of the Provisional Patent Application Ser. No. 61/394,032 filed Oct. 18, 2010, the disclosure of which is incorporated herein by reference in its entirety.

FIELD OF THE INVENTION

The present invention relates to the field of extruders.

BACKGROUND OF THE INVENTION

Extrusion devices are used to melt, blend, and form materials into a desired shape. Typical extrusion devices include a rotating screw housed coaxially within a heated, cylindrically-shaped barrel. The screw rotates within the barrel and drives an extrusion material, such as plastic, through the barrel. The extrusion material is forced through a die or aperture at the end of the barrel.

The temperature of the extrusion material is usually controlled in the barrel to achieve a product having desired characteristics and one that has an appropriate consistency to be forced through the die.

A controller receives signals from the temperature sensors positioned in and around the barrel of the extruder at different locations along the length of the barrel. The controller determines whether the temperature of a given heat exchange zone is too cool or too hot relative to the temperature set point for that heat exchange zone. If there is a difference, the controller signals the appropriate heat exchange elements to increase or decrease the heat in the particular zone.

SUMMARY OF THE INVENTION

There is disclosed herein a heater-cooler system for a barrel extruder. The heater cooler system includes a plurality of heaters adapted to be in thermal communication with at least a portion of a barrel of an extruder. The heater-cooler system includes a plurality of shroud assemblies, each of the plurality of shroud assemblies defining a cavity between one of the plurality of shroud assemblies and one of the plurality of heaters. Each of the plurality of heaters is enclosed by one of the plurality of shroud assemblies. Each of the plurality of shroud assemblies has an intake port and an exhaust port, and each of the plurality of shroud assemblies is mounted to one of the plurality of heaters. The heater-cooler system includes a blower connected to the intake port and in fluid communication with the cavity. The blower is operable to deliver air to the cavity when the blower is operated. A portion of the each of the plurality of shroud assemblies at the exhaust port defines a flap moveably integrated therewith. The flap is configured to be opened by an increase in pressure in the cavity caused by operation of the blower so that the cavity is in fluid communication with an area outside of the cavity and outside of the plurality of shroud assemblies. The flap substantially seals the cavity in a closed position upon termination of blower operation.

DETAILED DESCRIPTION OF THE INVENTION

Figure 1:
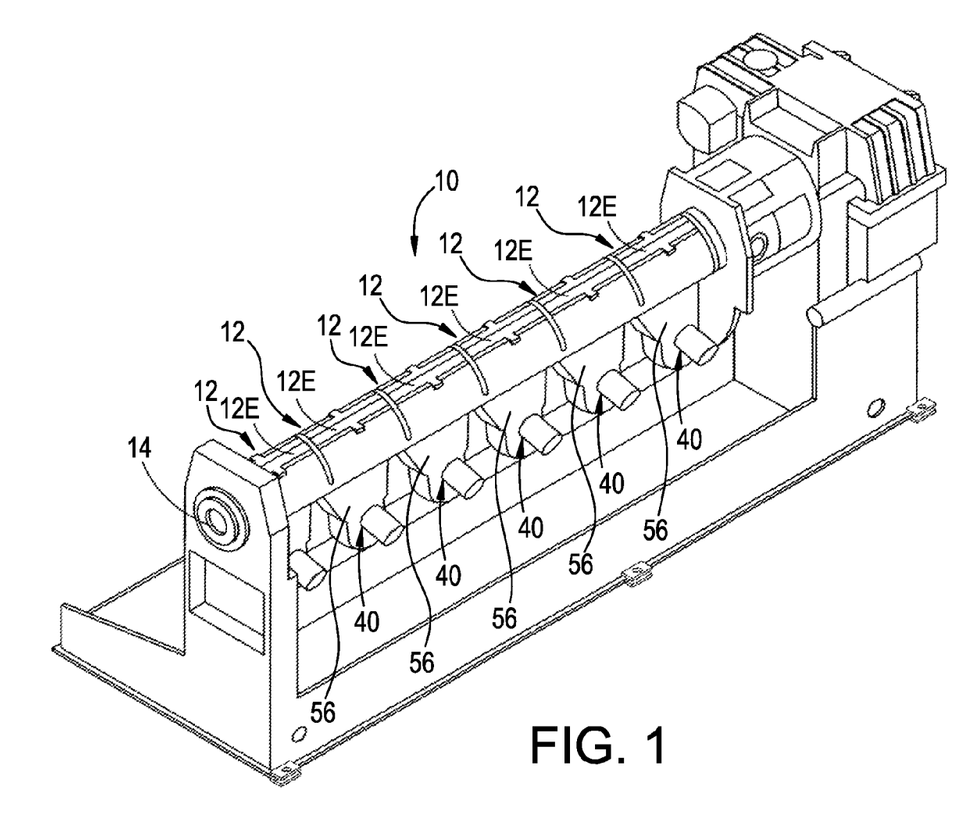
FIG. 1 is a perspective view of a single barrel extruder.

In reference to FIG. 1, a single barrel extruder 10 is shown. In this description, the present invention is discussed with reference to a single barrel extruder. It should be readily understood, however, that the heater-cooler system in accordance with the present invention can be used with an extruder having more than one barrel.

As shown in FIG. 1, an extruder generally designated by the reference number 10, includes a longitudinally extending barrel 14 having a plurality of heater-cooler systems 12 systems coupled thereto. Each heater-cooler system 12 surrounds a portion of the barrel 14 of the extruder 10. The location of each heater-cooler system 12 corresponds to a barrel temperature zone. During operation, the heater-cooler system 12 is operable to control the temperature of the corresponding barrel temperature zone by supplying heat to, or removing heat from the barrel 14. Each heater-cooler system 12 can also operate as a heat-sink in thermal communication with the barrel 14 to conduct heat away from barrel 14. The heat transfer from the barrel 14 can be enhanced by causing air to pass over the heater-cooler system. The heater-cooler system 12 also includes one or more heating elements to add heat to the barrel 14 when necessary. The extruder 10 is shown having a blower 40 in communication with each of the heater-cooler systems 12. An open exhaust port 12E is positioned on top of each heater-cooler system 12.

Figure 2:
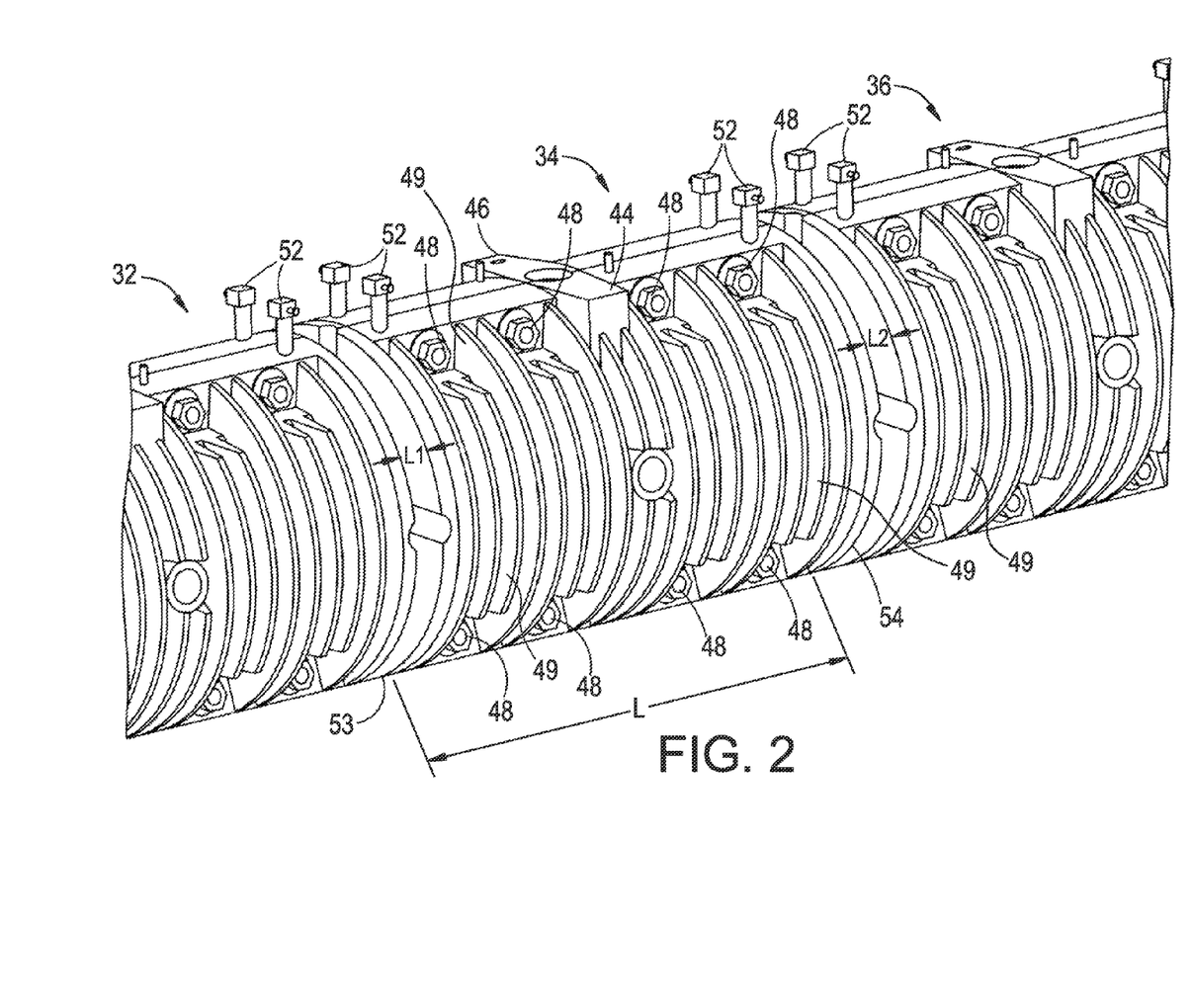
FIG. 2 is a perspective view of three heaters in thermal communication with a barrel of an extruder.

FIG. 2 shows a portion of several heater-cooler systems 12 in accordance with the present invention. Specifically, FIG. 2 shows three heaters 32, 34, 36. Each heater 32, 34, 36 is in thermal communication with an outer surface of the barrel 14. In reference to heater 34, it includes two components 44, 46. In the illustrated embodiments, the components 44 and 46 are symmetric. However, the present invention is not limited in this regard as the components do not have to be symmetric. The components 44 and 46 are made from a suitable material, such as, but not limited to, aluminum. In the illustrated embodiment, the components 44, 46 are held together with a plurality of fasteners 48 so that the heater 34 surrounds the barrel 14. However, the present invention is not limited in this regard as other means of clamping the components 44 and 46 together, such as, but not limited to metal bands, can also be employed.

When the heater 34 is fastened around the barrel 14 an inner surface of the heater 34 is in thermal communication with an outer surface of the barrel 14. In some embodiments, the barrel 14 is in direct contact with the heater 34. In other embodiments, one or more elements may be between the outer surface of the barrel 14 and the heater 34. In such cases, the heater 34 is still in thermal communication with the barrel 14.

Figure 7:
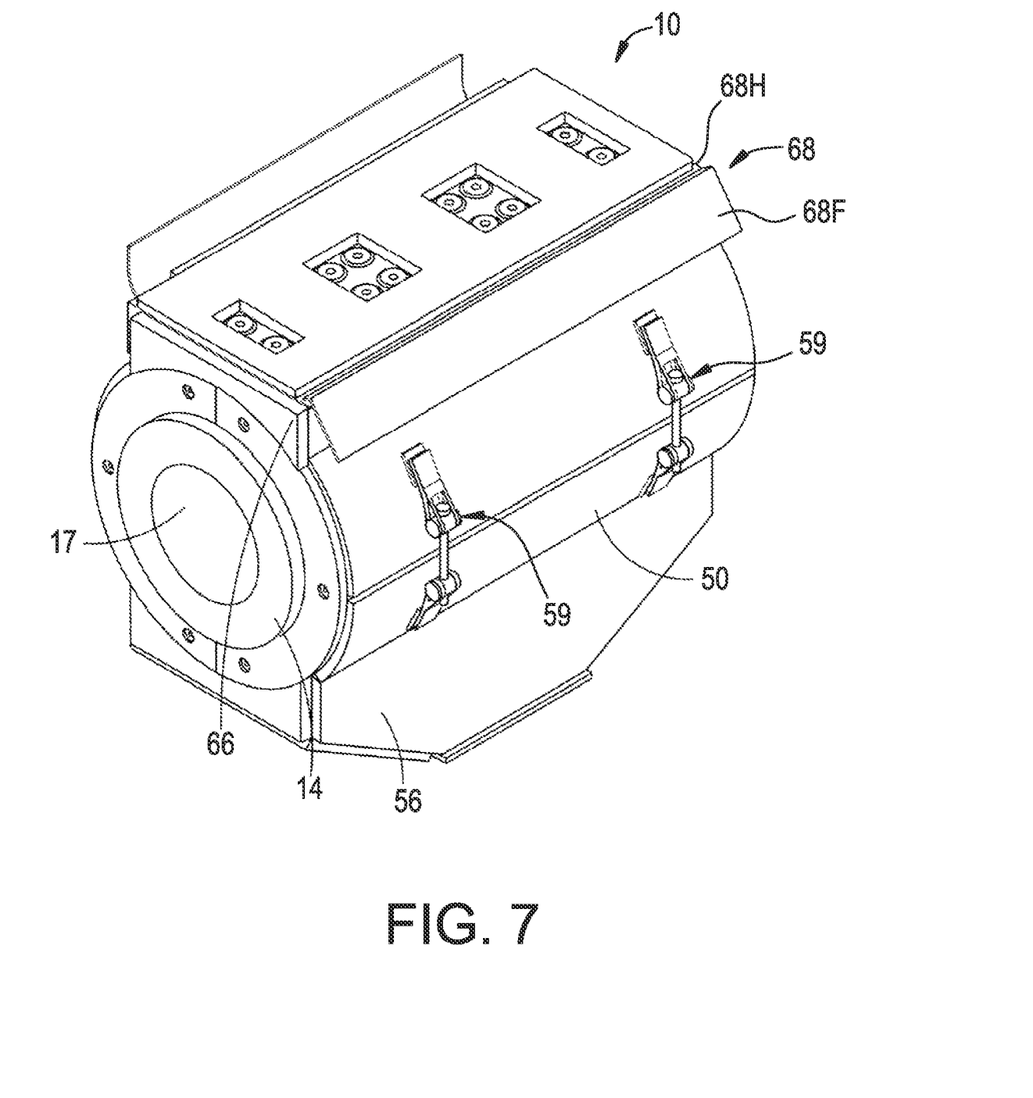
FIG. 7 is a perspective view of one of the heater-cooler systems shown in FIG. 5 and being enclosed in one of the shroud assemblies.

An area of the heater 36 proximate to the barrel 14 is referred to as the base 55. In the illustrated embodiment, the base 55 is generally solid and is contoured to conform to the outer surface of the barrel 14. The illustrated heater 34 further includes a plurality of spaced apart fins 49 extending outwardly from the base of the each of the heaters 32, 34 and 36. Each of the heaters 32, 24 and 36 extend along the barrel 14. For example, the heater 34 extends longitudinally along the barrel 14 a length L from a first end point 53 to a second end point 54. As shown in FIG. 2, there is a space between each heater 32, 34, 36 along the longitudinal axis of the barrel 14. For example, there is a space L1 between the heater 32 and the heater 34 and there is a space L2 between the heater 34 and the heater 36. A portion of a shroud assembly 50 as shown in FIGS. 5A and 7 can be inserted in the space L1, L2 between each heater 32, 34, 36 in order to enclose each of the heaters 32, 34, 36 in a respective one of the shroud assemblies 50. In reference to FIG. 2, the heater 34 further includes a plurality of mounts 52 for connecting the shroud assembly 50. It should be understood that the present invention is not limited in this regard, and that many different configurations of shroud assemblies can be used with the present invention.

Figure 3:
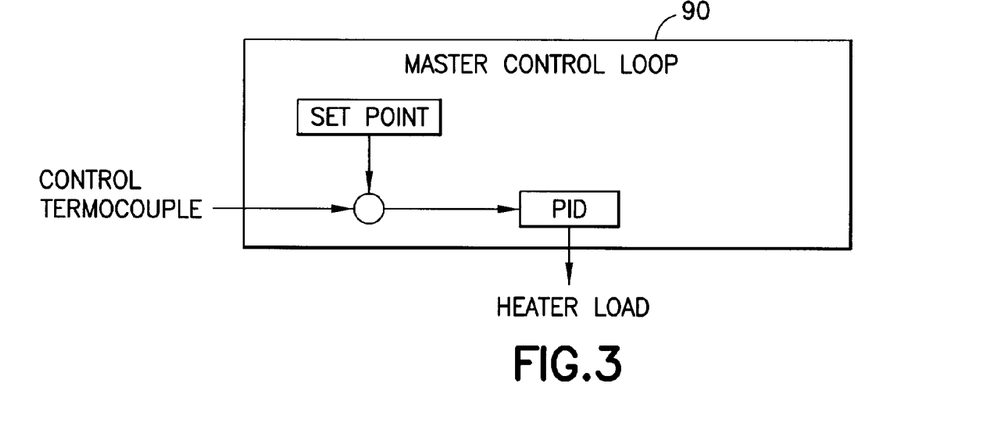
FIG. 3 is a diagram of a controller in accordance with one embodiment of the present invention.
Figure 4:
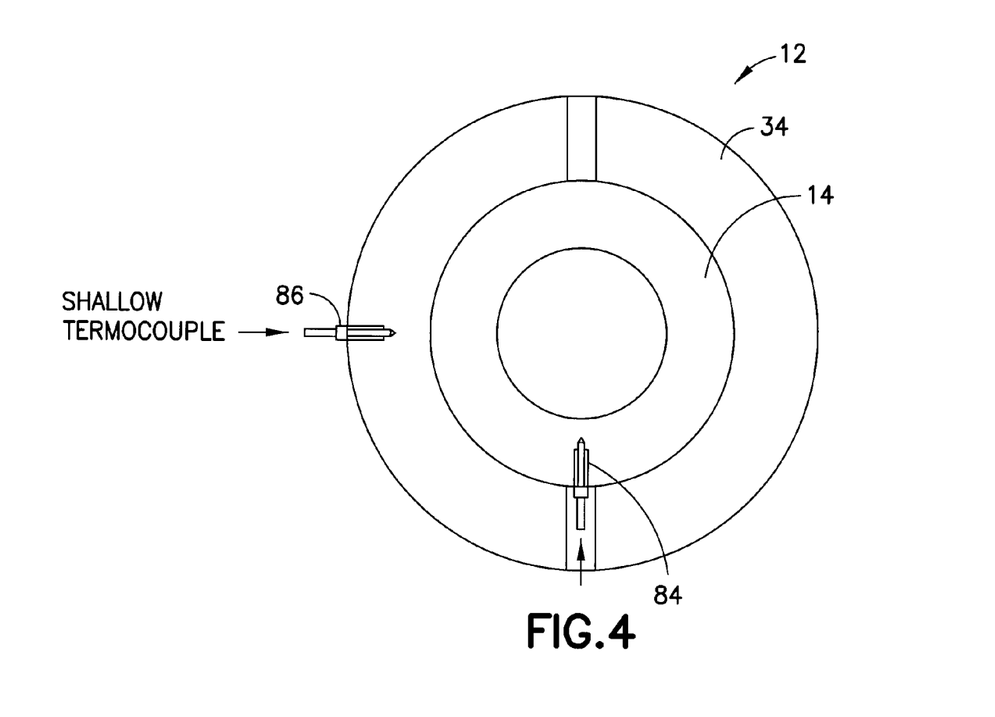
FIG. 4 is a cross-sectional view of a barrel of an extruder in accordance with one embodiment of the present invention.

As shown in FIG. 4, a heater 34 of the heater-cooler system 12 surrounds a section of the barrel 14 of a single barrel extruder. A first thermocouple 84 is inserted into the barrel and is used to measure a temperature of the barrel. A second thermocouple 86 is inserted into the heater and is used to measure a temperature at the heater 36. In reference to FIG. 3, a controller 90 causes the amount of heat added to, or subtracted from, a barrel temperature zone to be adjusted. For example, a user of a heater-cooler system sets a desired temperature set point for one or more of the barrel temperature zones. Based on information received from the thermocouples, the controller 90 (e.g., a Proportional Integral Derivative (PID) controller) is in communication with the heater 36 to regulate the heating and is in communication with the cooler (e.g., the blower 140) to cool the barrel temperature zones. It should be understood that the present invention is not limited in this regard and that different control systems may be employed to regulate the temperature.

Figure 5:
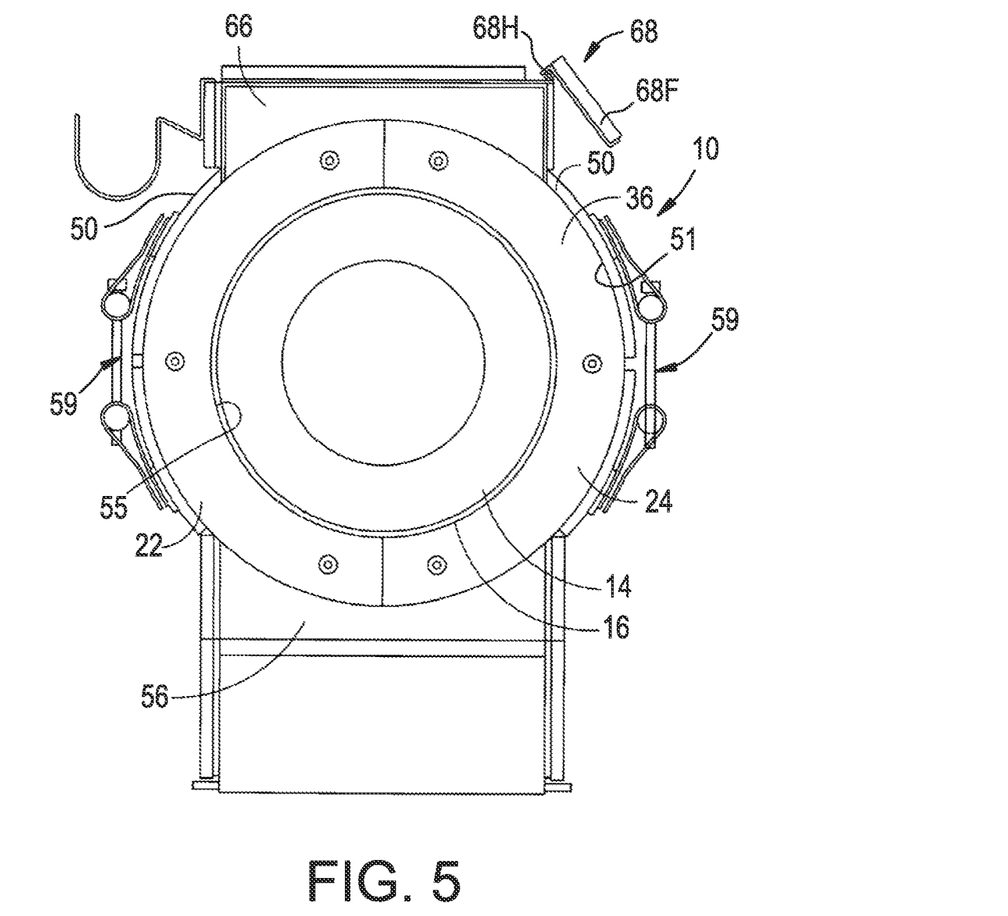
FIG. 5 is a view of a portion of a heater-cooler system in accordance with one embodiment of the present invention.
Figure 5A:
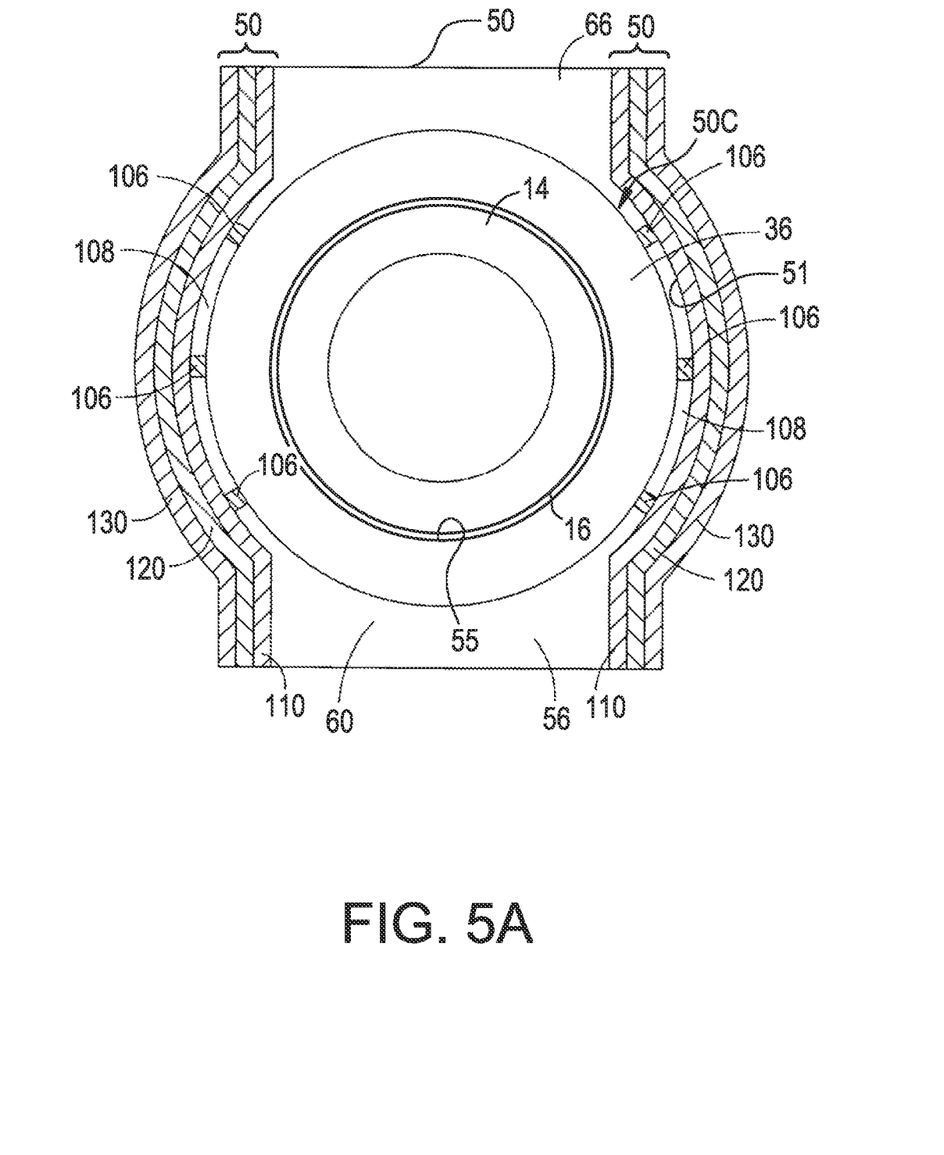
FIG. 5A is a cross-sectional view of a shroud assembly in accordance with one embodiment of the present invention.

As shown in FIG. 5, one of the heaters 36 is in thermal communication with the outer surface 16 of the barrel 14. In the illustrated embodiment, the heater 12 comprises two halves 22, 24 wherein each half 22, 24 is adapted to surround and engage a portion of the barrel 14. A shroud assembly 50 surrounds the heater 36 creating a cavity between the shroud assembly and the heater. The shroud assembly 50 is secured around the heater 36 by suitable fasteners such as clamps 59. Each of the shroud assemblies 50 include an intake port 56 and an exhaust port 66. The intake port 56 is in fluid communication with the cavity. Similarly, the exhaust port 66 is in fluid communication with the cavity. In reference to FIG. 5, the intake port 56 is on the bottom side of the shroud assembly 50. The intake port 56 is configured such that a blower or other device or fluid supply arrangement can be connected to the intake port 56, either directly or indirectly, for example, by a conduit.

As shown in FIG. 5, a damper valve 68 in fluid communication with the exhaust port 66 and the valve 68 defines a portion (e.g., a wall) of the exhaust port 66. In the embodiment illustrated in FIGS. 5, 6 and 7 the damper valve 68 is a flap 68F that is moveably integrated with the exhaust port 66 via a hinge point 68H. The damper valve 68 (e.g., the flap 68F) is moveable between an open position and a closed position. The system is configured so that when the valve 68 is in the open position the cavity is in fluid communication with an area outside of the cavity through the exhaust port 66 and when the valve 68 is in the closed position, the exhaust port 66 is substantially sealed and the cavity is not in fluid communication with an area outside of the cavity through the exhaust port. In some embodiments, the damper valve 68 is biased between an open position to a closed position by a spring mechanism.

It should be understood that many different types of valves can be used with the present invention. It should further be understood that many different biasing mechanisms are known and may be used with the present invention. For example, in some embodiments the valve 68 may be pneumatically activated. In some embodiments, each heater-cooler system includes a plurality of vents, while in other embodiments each heater-cooler system includes a single vent. It certain embodiments, in which each heater cooler system has a plurality of vents, it is possible to independently and variably actuate the individual vents between, so that some vents are open and some vents are closed, thereby providing a variable heat transfer effect along the length of the system.

As shown in FIG. 5A, each of the shroud assemblies 50 defines a cavity 50C defined by an interior surface 51 of each of the shroud assemblies 50 and includes an intake port 56 and an exhaust port 66. Each of the heaters 32, 34, 36 is surrounded by a respective one of the shroud assemblies 50, For example, the heater 36 is surrounded by one of the shroud assemblies 50 as illustrated in FIG. 5A. The shroud assembly 50 includes a first layer of material 110 that is substantially rigid. In the embodiment shown, the shroud assembly 50 is constructed from sheet metal. Sheet metal is selected because it can be configured into a rigid enclosure that defines the cavity 60. However, the present invention is not limited in this regard as materials other than sheet metal, such as, but not limited to composite materials, may also be employed. The shroud assembly 50 includes a second layer 120 adjacent to the first layer 110. The second layer 120 comprises a layer of insulation. For example, a material is selected for the second layer 120 having an R value greater than the R value for the first layer 110. In the illustrated embodiment, the second layer 120 is shown outside of the first layer 110 relative to the cavity. It should be understood that the present invention is not so limited, and that in some embodiments the second layer is inside of the first layer.

Still referring to FIG. 5A, the shroud assembly 50 includes a third layer of material 130 adjacent to the second layer 120. In the embodiment shown, the third layer of material comprises sheet metal. The third layer 130 serves to maintain the insulation layer 120 in position, and the third layer 130 protects the second layer 120 from external interference. While the second layer 120 and third layer 130 have been described as comprising sheet metal, the present invention is not limited in this regard as other materials such as polymers and fiberreinforced composite materials can be substituted without departing from the broader aspects of the present invention.

In further reference to FIG. 5A, the first layer 110 of the shroud assembly 50 is radially offset from the heater 36. A gap 108 is provided between the heater 36 and the first layer 110. A plurality of standoffs 106 are included between the heater 36 and the first layer 110 to maintain the gap 108. In the embodiment shown, the standoffs 106 extend outwardly from the heater 36. The standoffs 106 may include, for example, outwardly extending pins, strips, or discs. In the embodiment illustrated in FIG. 5A each of the standoffs 106 are positioned between the heater 36 and the corresponding shroud assembly 50. Each of the standoffs 106 engages and is positioned radially outward of the heater 34 and engages the inner surface 51 of the respective shroud assembly 50. The gap 108 serves to reduce heat transfer between the heater 36 and the shroud 50, and therefore improve insulation performance, by reducing the flow of heat from the heater 36 to the shroud assembly 50. While the above embodiment has been described as comprising a gap 108 between the heater 36 and the shroud assembly 50, the present invention is not limited in this regard as other configurations can be used without departing from the broader aspects of the present invention.

Figure 6:
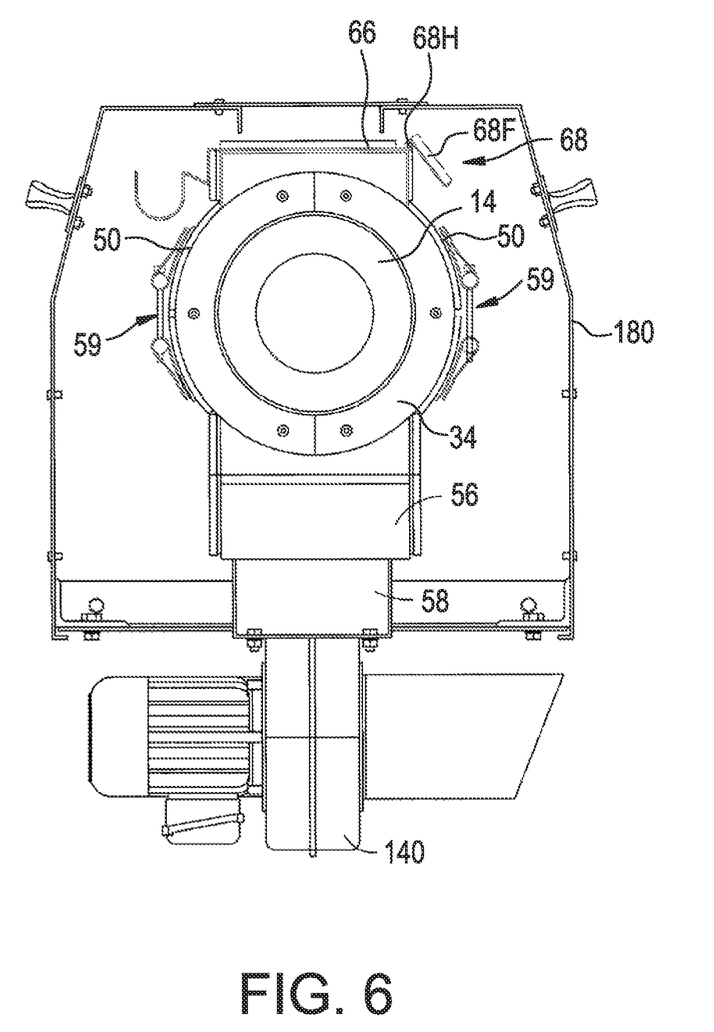
FIG. 6 is view of the heater-cooler system shown in FIG. 5.

As shown in FIG. 6, a blower 140 is in fluid communication with the intake port 56 and is connected thereto by extension element 58. The blower delivers air or another gas into the shroud assembly 50 through the intake port 56. The air passes over the fins of the heater 36 and exits the cavity through the exhaust port 66. When the blower 140 is operated, it increases the air pressure inside the cavity, thus biasing the damper valve 68 toward the open position. The system is configured such that the damper valve moves toward the closed position when the blower is not operated and the damper valve moves toward the open position when the blower is activated. In particular, the blower 140 is connected to the intake port 56 and is in fluid communication with the cavity. The blower 140 is operable to deliver air to the cavity when the blower 140 is operated. The flap 68F is configured to be opened by an increase in pressure in the cavity caused by operation of the blower 140 so that the cavity is in fluid communication with an area outside of the cavity and outside of the plurality of shroud assemblies 50 and the flap 68F substantially seals the cavity in a closed position upon termination of operation of the blower 140 operation. In further reference to FIG. 6, an outer housing 180 is shown. The outer housing 180 surrounds the plurality of shroud assemblies 50.

Tests comparing the heater-cooler system in accordance with the present invention to a known heater-cooler system were conducted to determine the amount of energy lost by convection and radiation by each system respectively. In the drawings, the heater-cooler system in accordance with the present invention is referred to as the EEACEH (energy efficient air cooled electric heated system) and the known heater-cooler system is referred to as the ACEH (air cooled electric heated system). The test setup used a section of barrel selected to simulate the length of a barrel temperature zone in a single barrel extruder. In order to simulate an extrusion material, oil was circulated through the barrel section. Each heater-cooler system was tested at specific temperature set points. The amount of electricity required by each heater-cooler system was tracked using a power analyzer.

Figure 8:
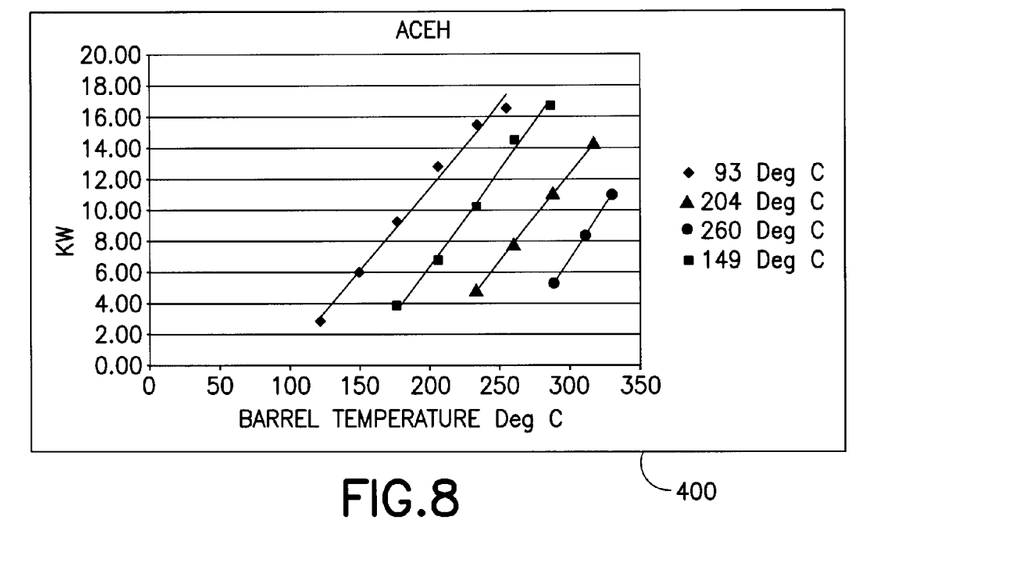
FIG. 8 is a graph showing energy consumption versus barrel temperature for a known heater-cooler system.
Figure 9:
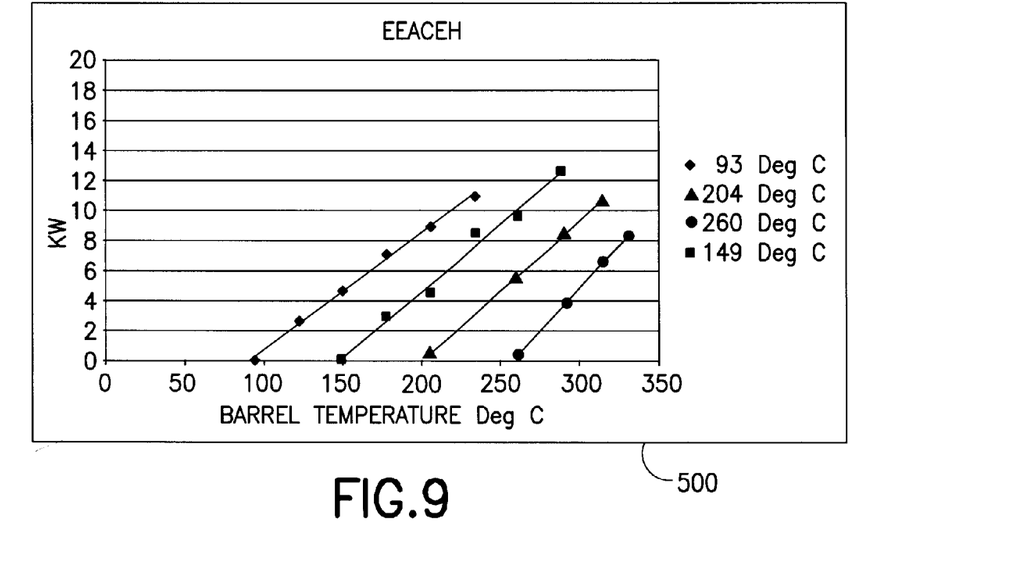
FIG. 9 is a graph showing energy consumption versus barrel temperature for a heater-cooler system in accordance with one embodiment of the present invention.

The improvement in the energy efficiency between the heater-cooler system in accordance with the present invention and the previously known systems can be determined by examining the slopes, kW/Deg C, of the operating lines shown in the chart 400 in FIG. 8 and the chart 500 in FIG. 9. Comparing an operating line for a given internal process temperature between FIG. 9 and FIG. 8 shows that the slopes of the lines, kW/Deg C, on FIG. 9 are lower than on FIG. 8. This comparison illustrates that the heater-cooler system in accordance with the present invention maintains a barrel zone temperature set point using less energy when compared to a conventional design for a given temperature.

Figure 10:
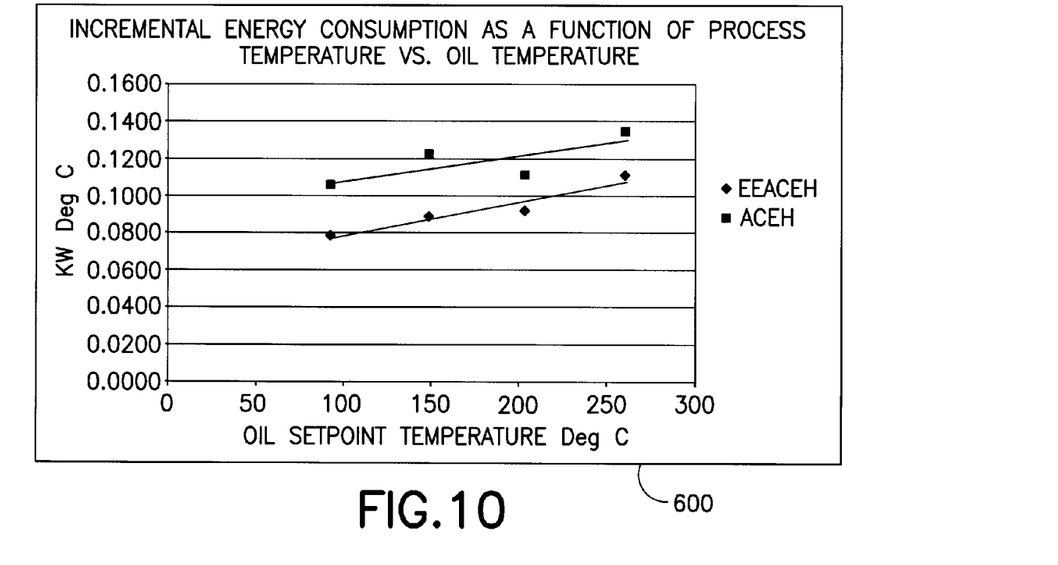
FIG. 10 is a graph showing the incremental energy consumption as a function of process temperature versus oil temperature for a known heater-cooler system and for a heater-cooler system in accordance with one embodiment of the present invention.

The chart 600 shown in FIG. 10 plots the slopes of each of the operating lines generated in FIGS. 8 and 9 against the barrel temperature zone set point. When comparing the performance at a given temperature, the operating line with the lesser slope value kW/Deg C, is the more efficient design. FIG. 10 clearly shows that the energy efficient design in accordance with the present invention achieved a lower slope for each of the temperatures tested.

Figure 11:
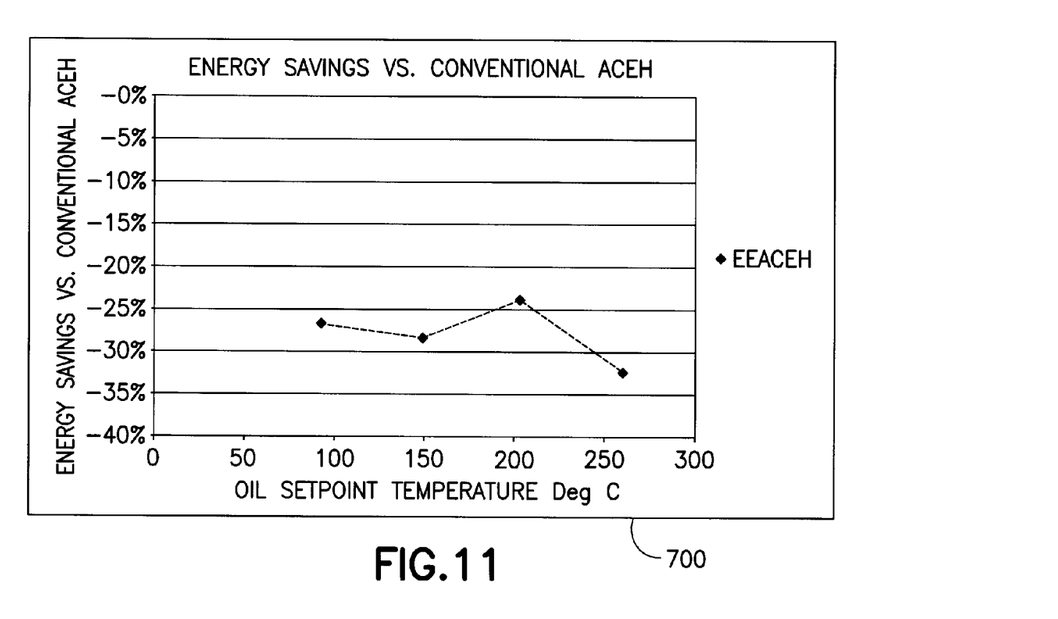
FIG. 11 is a graph showing energy savings realized using a heater-cooler system in accordance with one embodiment of the present invention.

To graphically compare the expected improvement in energy efficiency between the design in accordance with the present invention and a known design, the data in FIG. 10 was normalized using the performance of the known system as the baseline for each internal processing temperature condition. The chart 700 shown in FIG. 11 shows that the heater-cooler system in accordance with the present invention achieves the same barrel set-point temperatures for a given internal process temperature using 24-33% less energy than known heater-cooler systems.

Although the present invention has been disclosed and described with reference to certain embodiments thereof, it should be noted that other variations and modifications may be made, and it is intended that the following claims cover the variations and modifications within the true scope of the invention.

What is claimed is:

1. A heater-cooler system for a barrel extruder, comprising:
   a plurality of heaters adapted to be in thermal communication with at least a portion of a barrel of an extruder;
   a plurality of shroud assemblies, each of the plurality of shroud assemblies defining a cavity between one of the plurality of shroud assemblies and one of the plurality of heaters, each of the plurality of heaters being enclosed by one of the plurality of shroud assemblies, each of the plurality of shroud assemblies having an intake port and an exhaust port, and each of the plurality of shroud assemblies being mounted to one of the plurality of heaters;
   a blower connected to the intake port and being in fluid communication with the cavity, the blower being operable to deliver air to the cavity when the blower is operated; and
   a portion of the each of the plurality of shroud assemblies at the exhaust port defining a flap moveably integrated therewith, the flap being configured to be opened by an increase in pressure in the cavity caused by operation of the blower so that the cavity is in fluid communication with an area outside of the cavity and outside of the plurality of shroud assemblies and the flap substantially sealing the cavity in a closed position upon termination of blower operation.

2. The system of claim 1, wherein each of the plurality of heaters comprises a base adapted to engage at least a portion of the barrel and a plurality of spaced apart fins extending outwardly from the base.

3. The system of claim 1, wherein each of the plurality of shroud assemblies comprises a substantially rigid first layer.

4. The system of claim 3, wherein each of the plurality of shroud assemblies comprises an insulating second layer.

5. The system of claim 4, wherein each of the plurality of shroud assemblies comprises a substantially rigid third layer.

6. The system of claim 3, wherein a gap is provided between the first layer and each of the plurality of heaters.

7. The system of claim 1, further comprising:
a plurality of standoffs positioned between each of the plurality of heaters and a corresponding one of the plurality of shroud assemblies; and
each of the plurality of the standoffs engaging and being positioned radially outward of one of the plurality of heaters and engaging an inner surface of one of the plurality of shroud assemblies.

* * * * *